Sept. 14, 1926.
H. F. ROACH
1,599,718
METHOD OF PROJECTING MULTIPLE IMAGES
Filed Oct. 20, 1924     2 Sheets-Sheet 1
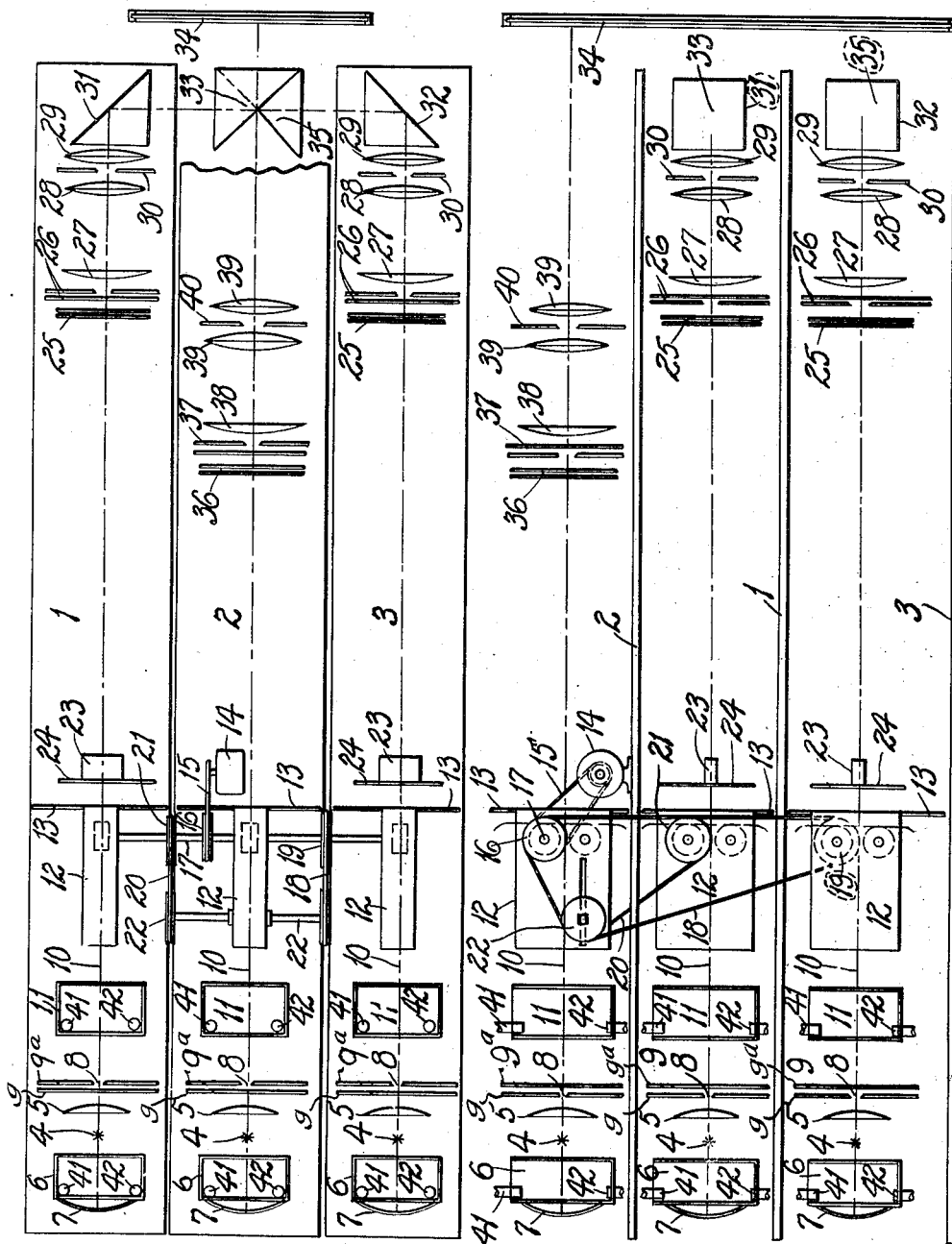
INVENTOR
HARRY F. ROACH
BY Bruce S. Elliott
ATTORNEY Sept. 14, 1926.

H. F. ROACH 1,599,718

METHOD OF PROJECTING MULTIPLE IMAGES

Filed Oct. 20, 1924   2 Sheets-Sheet 2

INVENTOR:
HARRY F. ROACH
BY Bruce S. Elliott
ATTORNEY

Patented Sept. 14, 1926.

1,599,718

UNITED STATES PATENT OFFICE.

HARRY F. ROACH, OF ST. LOUIS, MISSOURI.

METHOD OF PROJECTING MULTIPLE IMAGES.

Application filed October 20, 1924. Serial No. 744,643.

This invention relates to a novel method of projecting multiple images upon a screen for the purpose of investigating minute movements, due to any cause, or for deducing stresses incident to distortion of a member produced by the presence of a load.

The broad idea of the invention consists in the projection of a normal and an anamorphous image of the object upon a single screen, and preferably positioned one above the other on the same vertical axis of the screen, with the normal image preferably located at the upper portion of the screen, whereby the records of the time, place, scale of image with reference to the object, the image of which is projected, may be readily recognized and conveniently used when appearing on the image, the great relative magnification which is produced in the anamorphous image throwing much of this record off of the screen. By this method, the complete data of premise will appear upon the screen. Furthermore, by projecting the normal and anamorphous images on the same screen and on the same axis, comparison between the normal image and the magnified image is facilitated, the location of the zone of magnification more readily determined, and the cause of deformation, or minute movement or displacement, revealed. If desired, the method may be extended by introducing two or more anamorphous projections of the image, each being on the same axis of selection, but in a different plane. In this way, anamorphous projections of different parts of the same structure, or of different structures or bodies, subjected to the same load may be placed upon the screen for purposes of comparison with the normal image of the object or structure, thereby producing a convenient and usable exhibit affording information as to cause and effect. For example, the normal image may be that of a wheel passing over a track at the point where the abutting ends of two rails are connected by a joint. The anamorphous projection may be that of the head of the rail, or one anamorphous projection may be of the head of the rail and another of the web, or one anamorphous projection may be of the head and another of the connecting joint. In the case of the lower anamorphous image, or of each anamorphous image if more than one is projected for the purpose of comparison with the normal image, the scale of one axis is preferably the same as that on the same axis of the upper normal image, while the scale on another axis is relatively magnified.

While I have referred to the anamorphous projection of an image, in actual practice, the image is usually a fine line placed on the object. For example, in the case of a rail, the line would be placed along one side of the head of the rail, and, owing to the great relative magnification which ensues in the practice of my invention, it is only a line which appears upon the screen. For this purpose, I may employ lines called, in mechanics, "elastic curve lines," or "strain lines," or even "points," or any other datum means for indicating relative displacement or movement in the object subjected to the load, phenomena, or the like.

In the accompanying drawing, illustrating, diagrammatically, an arrangement of apparatus for practicing my method:—

Figure 1 is a diagrammatic plan view of a preferred arrangement of apparatus;

Figure 2 is a diagrammatic view in elevation of the same apparatus; and

Figure 3:
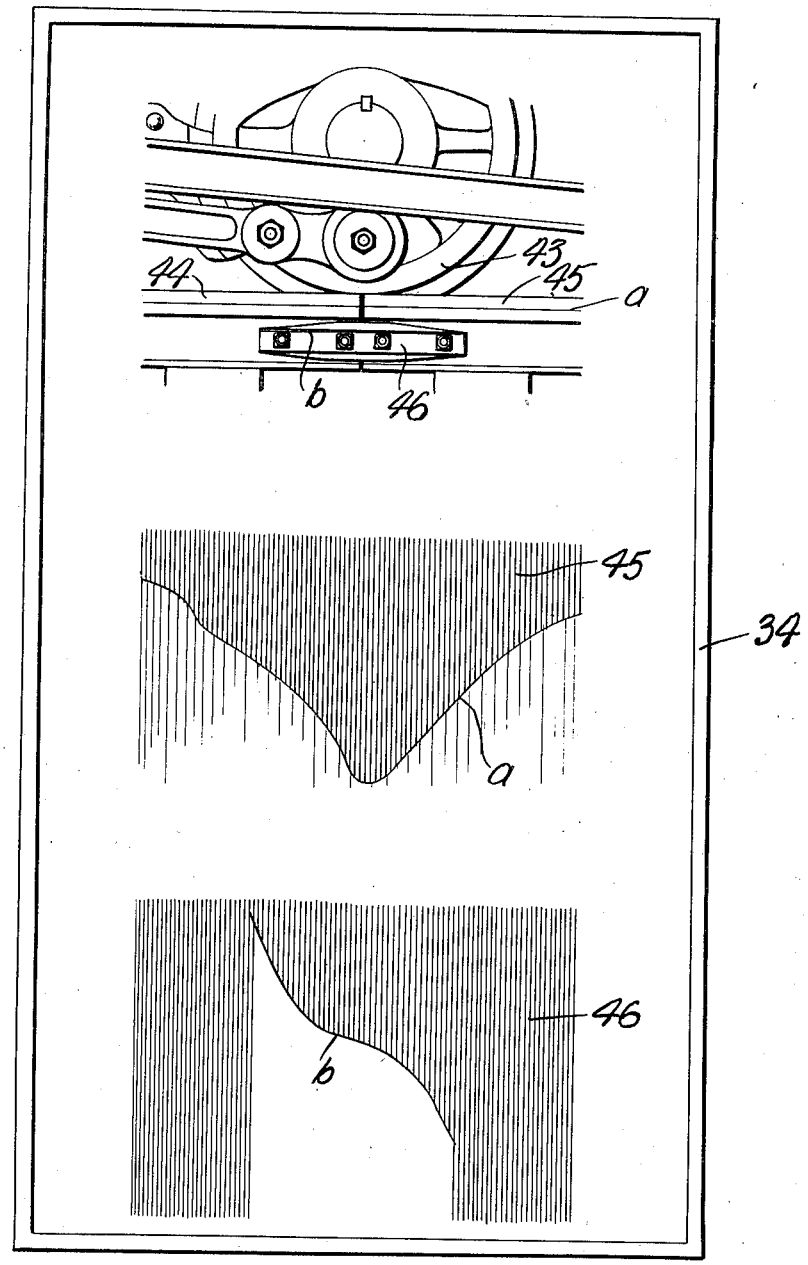

Figure 3 is a view in elevation of a screen showing, at the upper part of the screen, a normal photograph of the wheel of a locomotive passing over two rails at the point of their connection; at the central portion of the screen, an anamorphous projection, on the vertical axis of a line placed along the head of the rail; and at the lower part of the screen, an anamorphous projection of the line placed along the upper edge of one of the joints.

In order that my improved method may be understood, I will first describe the arrangement of apparatus shown diagrammatically in the drawings, Figures 1 and 2.

The numerals 1, 2 and 3 indicate, respectively, three metal bases which, in practice, would be approximately seventeen feet in length, on which are mounted the respective elements hereinafter referred to. Mounted on each of the bases 1 and 3 is apparatus for projecting an anamorphous image. Mounted on the base 2 is apparatus for projecting a normal image. Near one end (the left as shown in the drawings), each of the bases 1, 2 and 3 is provided with a source of high candle power light, indicated by the numeral 4, the rays of which pass in one direction through a lens 5, and in the other direction through a cooling element 6, whence they impinge upon a reflector 7 and are reflected back through the lens 5. From the lens 5, the rays pass through openings 8, 8ª in a pair of diaphragms 9, 9ª, the openings 8, 8ª being in the form of slits which are perpendicular to each other. The diaphragms 9, 9ª are separately adjustable vertically and horizontally through a range, say, of five inches, and they are also adjustable around the optical axis 10 through the angle of 360°. After passing through the openings in the diaphragms 9, 9ª the rays pass through a second cooling element 11, and then enter a moving picture projection apparatus 12, which is equipped with moving picture films, each apparatus being provided with a diaphragm 13. Each moving picture apparatus is adjustably mounted, so that each of the films may be so positioned with reference to the optical axis as that any portion of an exposure from top to bottom may appear on the optical axis of the beam of parallel rays. In case cinematographic effects are not desired, the moving picture projection apparatus may be removed, at the election of the operator, and in their place may be substituted glass negative carriers with diaphragms. The speed of the films in the three apparatus 12 is the same, and the position of the same image or images on the three films is alike as to the optical axis. This is accomplished through the medium of a motor 14 mounted on the base 2, from which a belt 15 passes to a pulley 16 mounted on the shaft 17 of the apparatus 12, mounted on base 2. A belt 18 passes from pulley 16 to a pulley 19 on a shaft operating the apparatus 12 on base 3, and a belt 20 passes from pulley 16 to a pulley 21 for operating the apparatus 12 on base 1. An adjustable belt-tightening pulley 22 is provided for adjusting the tension on the belts according to the adjustment which may be effected of the bases 1 and 3.

Mounted in front of each of the apparatus 12 on the bases 1 and 3 is an anamorphote 23. The anamorphote 23 is that known to the art for producing an anamorphous image such as is defined hereinafter. From each anamorphote 23, the rays pass through contrast light ray filters 25, thence through diaphragms 26, similar to the diaphragms 9, 9ª, thence through a lens 27, the position of which is the reverse of that of lens 5, thence through a pair of symmetrical projection lenses 28, 29, supplied with an adjustable diaphragm 30. From the lenses 29 the rays pass onto reflecting prisms 31, 32, respectively, each of which has a reflecting element of an angle of 45°. From the prism 31, the rays pass to a similar reflecting prism 33, whence they are reflected onto a screen 34. From the prism 32, the rays are reflected onto a prism 35, whence they are reflected onto the screen 34. The prisms 31 and 33 are adjustable relative to each other, and the prisms 32 and 35 are adjustable relative to each other. The prisms 33 and 35 are also independently adjustable in the vertical plane.

Referring to the apparatus on base 2, from the moving picture projecting apparatus 12, the rays pass through contrast light ray filters 36, diaphragms 37, lens 38, symmetrical projection lenses 39, and adjustable diaphragm 40, and from the last lens 39, the rays are projected directly upon the screen 34.

Referring more in detail to certain features of the apparatus, each of the reflectors 7 is ground and optically polished on one side to provide a surface of revolution of a radius described around the virtual point of light 4. It is recognized that the refraction of the light rays by reason of passing through the respective mediums of the container and its contents will slightly alter the geometric position of the point from which the reflector is described in order to produce the effect of position of the reflected rays as though the reflector were described from light 4 with the container removed. On these surfaces of revolution, the whitest silver is placed for affording the reflecting surfaces. Back of this silver is to be placed a medium for protecting the surface against any mechanical injury, or injury incident to the atmosphere. The other side of the lenses are ground and optically polished flat, and mounted on the elements 6 with the best Canadian balsom. The elements 6 and 11 are, as stated, for the purpose of removing the radiant heat from the rays of light passing through them. To this end, they are filled with distilled water, and where the light passes through these members, the glasses covering the openings for this purpose are optical and are ground and polished to optical accuracy. Suitable pipes 41, 42, respectively, are provided for the circulation of cold distilled water from a refrigerating apparatus. The lenses 5 each has on one side a flat optical surface, and on the other a surface of the form of a paraboloid of revolution, of such focal length as to produce beams of parallel rays from the light source 4 to the similar, but reversely positioned, lenses 27 and 38. The latter, of course, act to converge the parallel rays. These lenses are longitudinally adjustably mounted when properly positioned.

As to the moving picture projecting apparatus 12, it should be stated that no projecting lenses are used on these cameras, as the rays emanating from the sources of light 4, are transformed by the lenses 5 into beams of parallel rays and pass through the image on the film in the cameras 12 as parallel rays.

The symmetrical projection lenses 28, 29 and 39 are of a very large aperture and corrected, in design, completely for astigmatism, coma and spherical aberration. They are also so designed as to completely satisfy the Abbe Sine law. They are of sufficient diameter, as employed in the apparatus described, to cover a 4" x 5" negative. Each pair of these lenses is provided with an adjustable diaphragm, as stated, and they are adjustably mounted on the metal base. In other words, these lenses are of conventional form and design and highly corrected.

The screen 34 is of ground glass, and in the apparatus described, is about four feet square, and is mounted in a frame which is adapted to be supported in a substantial manner on the floor where the apparatus is to be used, independent of the bases 1, 2 and 3.

The optical edges of all of the diaphragms except those used in connection with the lenses 28, 29 and 39 are formed by dense, red glass, in order to minimize diffraction.

In order that the invention may be clearly understood, I will define the terms "normal" and "anamorphous" as used herein with respect to the different characters of images produced.

An image having a normal proportional scale is one in which the unit of dimension on all axes is the same.

An image having an anamorphous proportional scale is one in which the unit of dimension on two axes of selection are of different value.

It is the purpose of this method to produce on a screen an image of an object having normal proportional scale, and one or more images of the object appearing in the normal image of anamorphous scale or proportion. It is immaterial as to the order of production of these images. A normal proportional image may be taken of the object, and one or more positives made from the negative. The negative and two positives may then be placed in the apparatus and one be thrown on the screen as a normal proportional image, while the others are thrown on the screen with the use of the anamorphotes 23 to produce an image of anamorphosis of predetermined relative magnification as to the value of the unit of dimension on the respective selected axes.

A second method may consist in the use in the apparatus of a normal image and one or more anamorphous images of the normal, preferably taken directly from the object at the same time as the normal image is produced, the normal image being projected onto the screen as such, and the anamorphous images passing through the anamorphotes onto the screen with a still higher degree of anamorphosis.

Still another method may consist in producing a negative of normal proportions and one or more anamorphous negatives of a high degree of anamorphosis, then placing these negatives in the apparatus and throwing onto the screen directly therefrom the images that they will produce, without the insertion of the anamorphote in the path of the rays of light from any of the negatives.

As previously stated, the anamorphote 23 is one known to the art for producing an anamorphous image. For observation in the field, I would prefer to use the instrument devised by Paul Rudolph, and described and illustrated in British Patent No. 8512 of December 5th, 1898, for improvements in anamorphotic lens systems. For work in the laboratory, I would prefer to use the dioptric anamorphote shown and described in my Patent No. 1,552,453, dated September 8th, 1925, combined, of course, with a suitable lens system.

It will be understood, of course, that in producing an anamorphous image, it is within the scope of the invention to first produce a normal image and then produce an anamorphous image from the normal image, or a photograph thereof. The alternative course would be to use the anamorphous image that was made directly from the object as hereinbefore described, so that the image, magnified on an axis of selection, will be thrown by the camera directly upon the sensitized plate or upon the screen.

In the use of my method according to the apparatus shown, all of the images on the films in the respective moving picture projection apparatus will be normal, and anamorphosis is produced by causing the rays passing through the cameras 12 to pass through the anamorphotes 23.

It will be understood, of course, that a large number, perhaps several thousand, images of the object will appear upon the films in the apparatus 12. The films in these apparatus may be turned slowly by the use of a hand crank until it is determined the field or portion of the film or films which show the maximum of displacement or change in the object photographed while being subjected to the load or strain. Such selected anamorphous images may then be used for purposes of comparison with the normal image of the object. These images can, of course, be photographed for purposes of record by being projected onto a sensitized plate, and photographs produced from these plates in the usual way. There is, of course, theoretically, no limit to the number of anamorphous images of the object that may be thrown upon the screen for purposes of comparison with the normal image, subject only to the provision that all of the images, including the normal, shall be on the same axis of selection. Thus, in determining the stresses in various parts of a bridge produced when a train is running thereover, lines may be drawn on different parts of the structure, and these lines be magnified by using the appropriate number of apparatus, and the displacement or change in the various structures or parts to be investigated will appear from the anamorphous projection of these lines on the screen in superimposed or other defined relation.

In the drawing, Figure 3, I have shown a normal image of a locomotive wheel passing over a track at the point of connection of two rails, and an anamorphous image of a line on the rail, and another of a line on the rail joint, all the images, of course, being on the same vertical axis.

In this view, the numeral 43 indicates the wheel, and 44 and 45, two abutting rails connected by a rail joint 46. The letter $a$ indicates a fine line placed on the side of the heads of the rails 44 and 45, and the letter $b$ a similar line placed on the side of the rail joint 46 near the upper edge thereof. The first anamorphous image shows the relative magnification of the line $a$ in the zone of the abutting ends of the rails, and the second anamorphous image shows the relative magnification of a portion of the line $b$ in the vertical axis of the anamorphous image $a$.

From these deformations, may, by engineering formulæ, be deduced stresses in the respective members. Also, there may be determined phenomena from these observations.

I claim:

1. The herein described method, which consists in projecting upon a screen by means of a projecting machine a normal optical image, and simultaneously projecting on said screen an anamorphous optical image of the same object by means of another projecting machine, said anamorphous optical image having substantially a constant unit of value of anamorphosis throughout.

2. The herein described method, which consists in projecting upon a screen by means of a projecting machine a normal optical image of an object, and simultaneously projecting on said screen an anamorphous optical image of the same object by means of another projecting machine, said anamorphous optical image having a substantially constant unit of value of anamorphosis throughout, and so positioning the machines relative to the screen that the images projected will be positioned in different areas of the screen with the median lines of the images coinciding with a selected axis of the screen.

3. The herein described method, which consists in making a normal and an anamorphous optical image of an object, the anamorphous image having substantially a constant unit of value of anamorphosis throughout, projecting light rays from the respective images onto a screen by means of suitable projecting machines, and positioning said machines so that the respective normal and anamorphous images projected will appear in different areas of the screen and with the median lines of the images coinciding with a selected axis of the screen.

4. The herein described method, which consists in making a normal optical image of an object, and simultaneously making an anamorphous optical image thereof of relatively low magnification, and thereafter projecting rays from such images onto a screen, the anamorphous image being further relatively magnified in the process of projection along the axis of original magnification.

5. The method of making observations of minute movements in an object subject to a load or phenomena, which consists in taking two or more sets of optical images of the object on moving films, and then projecting light rays through said films onto a screen in a manner to display cinematographic normal and anamorphous images positioned in different areas thereon in the same selected axis of the screen.

In testimony whereof, I have hereunto set my hand.

HARRY F. ROACH.